United States Patent
Lee et al.

(10) Patent No.: US 11,643,496 B2
(45) Date of Patent: May 9, 2023

(54) POLYMER ELECTROLYTE HAVING SUPERIOR ION CONDUCTIVITY AND MECHANICAL STRENGTH AND METHOD OF MANUFACTURING SAME

(71) Applicants: HYUNDAI MOTOR COMPANY, Seoul (KR); KIA Motors Coporation, Seoul (KR); University of Seoul Industry Cooperation Foundation, Seoul (KR)

(72) Inventors: Ho Taek Lee, Seoul (KR); Young Min Kim, Seoul (KR); Hong Chui Moon, Seoul (KR)

(73) Assignees: Hyundai Motor Company, Seoul (KR); Kia Motors Corporation, Seoul (KR); University of Seoul Industry Cooperation Foundation, Seoul (KR)

( * ) Notice: Subject to any disclaimer, the term of this patent is extended or adjusted under 35 U.S.C. 154(b) by 263 days.

(21) Appl. No.: 17/000,678

(22) Filed: Aug. 24, 2020

(65) Prior Publication Data
US 2021/0095065 A1    Apr. 1, 2021

(30) Foreign Application Priority Data
Oct. 1, 2019    (KR) .......................... 10-2019-0121371

(51) Int. Cl.
C08F 293/00    (2006.01)
H01B 1/12    (2006.01)
C08F 212/08    (2006.01)

(52) U.S. Cl.
CPC ........ C08F 293/005 (2013.01); C08F 212/08 (2013.01); H01B 1/122 (2013.01); *C08F 2438/03* (2013.01)

(58) Field of Classification Search
CPC ................ C08F 212/08; C08F 293/005; C08F 2438/03; H01B 1/122
See application file for complete search history.

(56) References Cited

U.S. PATENT DOCUMENTS

| 7,999,020 B2 | 8/2011 | Frisbie et al. | |
| 8,889,301 B2 | 11/2014 | Balsara et al. | |
| 2015/0380767 A1* | 12/2015 | Darolles | H01M 10/0525 429/314 |

FOREIGN PATENT DOCUMENTS

| KR | 1957629 B1 * | 3/2019 | ............ C08F 212/14 |
| KR | 10-2019-0088212 A | 7/2019 | |
| WO | 2016/053065 A | 4/2016 | |

OTHER PUBLICATIONS

D. G. Seo, Y. M. Kim, H. Ahn, H. C. Moon, "Non-volatile, phase-transition smart gels visually indicating in situ thermal status for sensing applications", Nanoscale, 2019, 11, 16733-16742 (Year: 2019).*

(Continued)

*Primary Examiner* — James C Goloboy
(74) *Attorney, Agent, or Firm* — Morgan, Lewis & Bockius LLP (57) ABSTRACT

The present disclosure relates to an ion gel having superior ion conductivity and mechanical strength, a polymer electrolyte including the same, and a manufacturing method thereof. The method of manufacturing the ion gel is capable of simply and effectively manufacturing a polymer matrix through a one-pot reaction, thus exhibiting simple processing steps to thereby manifest excellent processing efficiency and generate economic benefits. Moreover, the polymer electrolyte including the ion gel can exhibit superior ion conductivity and mechanical strength despite the low glass transition temperature (Tg) of the monomer contained in the polymer matrix.

14 Claims, 7 Drawing Sheets

(56) References Cited

OTHER PUBLICATIONS

Y. M. Kim, W.Y. Lee, Y. Choi, H. C. Moon, "Impact of chain flexibility of copolymer gelators on performance of ion gel electrolytes for functional electrochemical devices", J. Ind. Eng. Chem., 2020, 90, 341-350 (Year: 2020).*

Y. M. Kim, D. G. Seo, H. Oh, H. C. Moon, "A facile random copolymer strategy to achieve highly conductive polymer gel electrolytes for electrochemical applications", J. Mater. Chem. C, 2019, 7, 161-169 (Year: 2019).*

English machine translation of KR-1957629 B1 (Year: 2019).*

\* cited by examiner

POLYMER ELECTROLYTE HAVING SUPERIOR ION CONDUCTIVITY AND MECHANICAL STRENGTH AND METHOD OF MANUFACTURING SAME

CROSS-REFERENCE TO RELATED APPLICATION

The present application claims priority to and the benefit of Korean Patent Application No. 10-2019-0121371, filed on Oct. 1, 2019, which is incorporated herein by reference in its entirety.

FIELD

The present disclosure relates to an ion gel having superior ion conductivity and mechanical strength, synthesis of a polymer constituting the same, and a method of manufacturing the same.

BACKGROUND

The statements in this section merely provide background information related to the present disclosure and may not constitute prior art.

Lithium ion batteries are energy storage devices with a broad spectrum of applications from small electronics to electric vehicles and very high potential applicability. All of cathode/anode materials, a membrane, an electrolyte, and the like, which are included in the lithium ion battery, may affect the performance of the lithium ion battery and are under active study, but research into electrolytes is relatively insufficient.

Meanwhile, an electrolyte is a basic component for various electrochemical devices such as electrolyte gate-type transistors, galvanic skin, and electrochromic (EC) or electrochemiluminescent devices, as well as the lithium ion battery.

In particular, ion conductivity and mechanical strength are two important factors in the evaluation of electrolytes. High ion conductivity directly leads to low-voltage operation (i.e. low voltage drop) and fast response of the electrochemical device. Moreover, the use of mechanically strong polymer gel electrolytes (PGEs) enables the implementation of flexible or stretchable devices, unlike conventional liquid electrolytes that have leakage problems. However, these two characteristics generally have a trade-off relationship. Thus, designing and manufacturing balanced PGEs is a challenge for high-performance electrochemical devices.

Existing physically crosslinked ion gels have superior ion conductivity at room temperature and exhibit moderate mechanical strength (elastic modulus of ones of kPa). In order to exhibit such performance, it is important that IL-insoluble spheres be directly connected by small amounts of intermediate blocks to form a network structure. In this regard, ABC triblock copolymers having IL-insoluble A and C blocks are suitable, and AB diblock copolymers cannot function as efficient polymer hosts. Specifically, in order to improve a mechanical modulus without sacrificing ion conductivity, IL-insoluble blocks may be selectively chemically crosslinked, but this complicates the synthesis of the copolymer.

Therefore, it is desired to develop a copolymer that may be easily synthesized and has superior ion conductivity and mechanical strength, and an ion gel and an electrolyte including the same.

SUMMARY

The present disclosure provides an ion gel, which includes a polymer matrix including a random copolymer having superior ion conductivity and mechanical strength and an ionic liquid, and a polymer electrolyte.

The present disclosure also provides simple synthesis of a polymer matrix including a random copolymer through a one-pot reaction, and methods of manufacturing an ion gel including the polymer matrix and a polymer electrolyte including the ion gel.

The present disclosure is not limited to the foregoing, and will be clearly understood through the following description and realized by the means described in the claims and combinations thereof.

An aspect of the present disclosure provides an ion gel, including a polymer matrix including a random copolymer having a repeating unit represented by Chemical Formula 1 below and a repeating unit represented by Chemical Formula 2 below, and an ionic liquid:

[Chemical Formula 1]

[Chemical Formula 2]

Each $R^{11}$ is independently selected from the group consisting of a halogen group, a nitrile group, a nitro group, an amine group, a substituted or unsubstituted $C_1$-$C_{10}$ alkyl group, a substituted or unsubstituted $C_1$-$C_{10}$ alkoxy group, a substituted or unsubstituted aryl group, a substituted or unsubstituted heteroaryl group and combinations thereof;

$n^{11}$ is 0 to 5;

$R^{12}$ is selected from the group consisting of hydrogen, a halogen group, a nitrile group, a nitro group, an amine group, a substituted or unsubstituted $C_1$-$C_{10}$ alkyl group, a substituted or unsubstituted $C_1$-$C_{10}$ alkoxy group, a substituted or unsubstituted aryl group, a substituted or unsubstituted heteroaryl group and combinations thereof;

$R^{21}$ is selected from the group consisting of hydrogen, a halogen group, a nitrile group, a nitro group, an amine group, a substituted or unsubstituted $C_1$-$C_{10}$ alkyl group, a substituted or unsubstituted $C_1$-$C_{10}$ alkoxy group, a substituted or unsubstituted aryl group, a substituted or unsubstituted heteroaryl group and combinations thereof;

$R^{22}$ is selected from the group consisting of a substituted or unsubstituted $C_1$-$C_{12}$ alkyl group, a substituted or unsubstituted aryl group, a substituted or unsubstituted heteroaryl group and combinations thereof;

the substituents of $R^{11}$ to $R^{22}$ are each independently selected from the group consisting of a halogen group, a cyano group, a nitro group, a hydroxyl group, a $C_1$-$C_8$ alkyl group and combinations thereof; and $n^1$ and $n^2$ are each independently a molar ratio of the repeating units, $n^1+n^2=1$, in which $n^1$ is a real number of 0.30 to 0.57, and $n^2$ is a real number of 0.43 to 0.70.

The ion gel may include 30 to 60 wt % of the polymer matrix and 40 to 70 wt % of the ionic liquid.

The weight average molecular weight ($M_w$) of the copolymer may be 100,000 to 500,000 g/mol or the number average molecular weight ($M_n$) of the copolymer may be 100,000 to 450,000 g/mol.

The ionic liquid may be selected from the group consisting of 1-ethyl-3-methylimidazolium bis(trifluoromethylsulfonyl)imide ([EMI][TFSI]), 1-ethyl-3-methylimidazolium hexafluorophosphate ([EMI][PF6]), 1-ethyl-3-methylimidazolium tetrafluoroborate ([EMI][BF4]), 1-butyl-3-methylimidazolium bis(trifluoromethylsulfonyl)imide ([BMI][TFSI]), 1-butyl-3-methylimidazolium hexafluorophosphate ([BMI][PF6]), 1-butyl-3-methylimidazolium tetrafluoroborate ([BMI][BF4]) and combinations thereof.

The ion gel may have an electrical conductivity of 0.50 to 0.60 mS/cm and an elastic modulus of $1.3 \times 10^4$ to $5.6 \times 10^4$ Pa.

Another aspect of the present disclosure provides a polymer electrolyte including the above ion gel and a metal salt.

The polymer electrolyte may include 30 to 60 wt % of the polymer matrix, 38 to 68 wt % of the ionic liquid, and 1.5 to 7.0 wt % of the metal salt.

The metal of the metal salt may be selected from the group consisting of lithium (Li), sodium (Na), potassium (K), calcium (Ca) and combinations thereof.

The polymer electrolyte may have an electrical conductivity of 0.50 to 0.80 mS/cm and an elastic modulus of $2.0 \times 10^4$ to $4.0 \times 10^4$ Pa.

Another aspect of the present disclosure provides a method of manufacturing an ion gel, the method including manufacturing a polymer matrix including a random copolymer obtained by randomly polymerizing a monomer represented by Chemical Formula 3 below and a monomer represented by Chemical Formula 4 below, and mixing the polymer matrix with an ionic liquid:

[Chemical Formula 3]

[Chemical Formula 4]

Each $R^{11}$ is independently selected from the group consisting of a halogen group, a nitrile group, a nitro group, an amine group, a substituted or unsubstituted $C_1$-$C_{10}$ alkyl group, a substituted or unsubstituted $C_1$-$C_{10}$ alkoxy group, a substituted or unsubstituted aryl group, a substituted or unsubstituted heteroaryl group and combinations thereof;

$n^{11}$ is 0 to 5;

$R^{12}$ to $R^{14}$ are selected from the group consisting of hydrogen, a halogen group, a nitrile group, a nitro group, an amine group, a substituted or unsubstituted $C_1$-$C_{10}$ alkyl group, a substituted or unsubstituted $C_1$-$C_{10}$ alkoxy group, a substituted or unsubstituted aryl group, a substituted or unsubstituted heteroaryl group and combinations thereof;

$R^{21}$, $R^{23}$ and $R^{24}$ are selected from the group consisting of hydrogen, a halogen group, a nitrile group, a nitro group, an amine group, a substituted or unsubstituted $C_1$-$C_{10}$ alkyl group, a substituted or unsubstituted $C_1$-$C_{10}$ alkoxy group, a substituted or unsubstituted aryl group, a substituted or unsubstituted heteroaryl group and combinations thereof;

$R^{22}$ is selected from the group consisting of a substituted or unsubstituted $C_1$-$C_{12}$ alkyl group, a substituted or unsubstituted aryl group, a substituted or unsubstituted heteroaryl group and combinations thereof; and the substituents of $R^{11}$ to $R^{24}$ are each independently a halogen group, a cyano group, a nitro group, a hydroxyl group, or $C_1$-$C_8$ alkyl group.

The manufacturing of the polymer matrix may be performed through a one-pot reaction.

The monomer represented by Chemical Formula 4 may have a glass transition temperature (Tg) of −45 to −55° C.

Yet another aspect of the present disclosure provides a method of manufacturing a polymer electrolyte, the method including mixing an ion gel manufactured by the above method with a metal salt.

According to the present disclosure, because a method of manufacturing an ion gel is capable of simply and effectively manufacturing a polymer matrix through a one-pot reaction, the processing steps are simple and thereby manifest excellent processing efficiency and generate economic benefits.

Also, according to the present disclosure, a polymer electrolyte including the ion gel of the present disclosure can exhibit superior ion conductivity and mechanical strength despite the low glass transition temperature (Tg) of the monomer used to synthesize the polymer matrix.

The effects of the present disclosure are not limited to the foregoing, and should be understood to include all effects that can be reasonably anticipated from the following description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Variations of the present disclosure are provided to thoroughly explain the present disclosure and to sufficiently transfer the spirit of the present disclosure to those skilled in the art.

It will be understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof.

Unless otherwise specified, all numbers, values, and/or representations that express the amounts of components, reaction conditions, polymer compositions, and mixtures used herein are to be taken as approximations including various uncertainties affecting the measurements that essentially occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

Unless stated otherwise herein, the term "$C_1$-$C_{10}$ alkyl group" refers to a primary to tertiary alkyl group having 1 to 10 carbon atoms. The alkyl group may be, for example, a functional group such as methyl, ethyl, n-propyl, i-propyl, n-butyl, i-butyl, tert-butyl, n-hexyl or the like.

Unless stated otherwise herein, the term "$C_1$-$C_{10}$ alkoxy" refers to an —O—R group, in which R includes "$C_1$-$C_{10}$ alkyl", "aryl", "heteroaryl" or"benzyl". Examples of the alkoxy group include methoxy, ethoxy, phenoxy, benzyloxy and the like.

Unless stated otherwise herein, the term "aryl group" refers to a chemical group obtained by removing one hydrogen atom from a monocyclic or polycyclic compound having 2 to 30 carbon atoms and derivatives thereof including at least one benzene ring. For example, the monocyclic or polycyclic compound including the benzene ring includes a benzene ring, toluene or xylene, in which alkyl side chains are attached to the benzene ring, biphenyl, in which two or more benzene rings are bonded through a single bond, fluorene, xanthene or anthraquinone, in which a benzene ring is condensed with a cycloalkyl group or a heterocycloalkyl group, and naphthalene or anthracene, in which two or more benzene rings are condensed.

Unless stated otherwise herein, the prefix "hetero" means that one to three hetero atoms selected from the group consisting of —N—, —O—, —S— and —P— substitute for carbon atoms. Examples thereof may include pyridine, pyrrole or carbazole, including a nitrogen atom as a hetero atom, furan or dibenzofuran including an oxygen atom as a hetero atom, dibenzothiophene, diphenylamine and the like.

Unless stated otherwise herein, the term "halogen group" means a Group 17 element, and may be, for example, a fluoro group, a chloro group, a bromo group, or an iodo group.

Unless stated otherwise herein, the bond lines at both ends of the chemical formula having no substituent indicate the moieties where this compound is linked to another compound.

Ion Gel

According to one form of the present disclosure, an ion gel includes a polymer matrix including a random copolymer and an ionic liquid.

Specifically, the ion gel according to the present disclosure includes 30 to 60 wt % of the polymer matrix and 40 to 70 wt % of the ionic liquid. If the amount of the polymer matrix is less than 30 wt %, sufficient mechanical strength may not be attained. On the other hand, if the amount thereof exceeds 60 wt %, ion conductivity may decrease. Also, if the amount of the ionic liquid is less than 40 wt %, ion conductivity may decrease. On the other hand, if the amount thereof exceeds 70 wt %, mechanical strength may decrease.

Thus, the ion gel manufactured according to the present disclosure is configured such that the polymer matrix including the random copolymer and the ionic liquid are uniformly mixed, and has an electrical conductivity of 0.50 to 0.60 mS/cm and an elastic modulus of $1.3 \times 10^4$ to $5.6 \times 10^4$ Pa, ultimately resulting in superior ion conductivity and mechanical strength.

(1) Polymer Matrix

In one form of the present disclosure, the polymer matrix includes a random copolymer having a repeating unit represented by Chemical Formula 1 below and a repeating unit represented by Chemical Formula 2 below.

[Chemical Formula 1]

[Chemical Formula 2]

Here, each $R^{11}$ is independently selected from the group consisting of a halogen group, a nitrile group, a nitro group, an amine group, a substituted or unsubstituted $C_1$-$C_{10}$ alkyl group, a substituted or unsubstituted $C_1$-$C_{10}$ alkoxy group, a substituted or unsubstituted aryl group, a substituted or unsubstituted heteroaryl group and combinations thereof.

$R^{11}$ substitutes for hydrogen of the benzene ring, and when $n^{11}$ is 0, all sites of the benzene ring are substituted with hydrogen, and when the benzene ring includes $R^{11}$, the remaining sites are substituted with hydrogen, as will be apparent to those skilled in the art of the present disclosure. When $n^{11}$ is 2 or more, $R^{11}$ may be the same or different substituents. Hereinafter, since the same is true for other substituents substituted in the benzene ring, a redundant description thereof will be omitted.

$R^{12}$ is selected from the group consisting of hydrogen, a halogen group, a nitrile group, a nitro group, an amine group, a substituted or unsubstituted $C_1$-$C_{10}$ alkyl group, a substituted or unsubstituted $C_1$-$C_{10}$ alkoxy group, a substituted or unsubstituted aryl group, a substituted or unsubstituted heteroaryl group and combinations thereof.

$R^{21}$ is selected from the group consisting of hydrogen, a halogen group, a nitrile group, a nitro group, an amine group, a substituted or unsubstituted $C_1$-$C_{10}$ alkyl group, a substituted or unsubstituted $C_1$-$C_{10}$ alkoxy group, a substituted or unsubstituted aryl group, a substituted or unsubstituted heteroaryl group and combinations thereof.

$R^{22}$ is selected from the group consisting of a substituted or unsubstituted $C_1$-$C_{12}$ alkyl group, a substituted or unsubstituted aryl group, a substituted or unsubstituted heteroaryl group and combinations thereof, and is preferably a substituted or unsubstituted $C_1$-$C_4$ alkyl group.

In the substituents of $R^{11}$ to $R^{22}$, hydrogen may be substituted with any one selected from the group consisting of a halogen group, a hydroxyl group, a carboxyl group, a cyano group, a nitro group, an amino group, a thio group, a methylthio group, an alkoxy group, a nitrile group, an aldehyde group, an epoxy group, an ether group, an ester group, a carbonyl group, an acetal group, a ketone group, an alkyl group, a perfluoroalkyl group, a cycloalkyl group, a heterocycloalkyl group, a benzyl group, an aryl group, a heteroaryl group, derivatives thereof and combinations thereof, and is preferably substituted with a halogen group, a cyano group, a nitro group, or a $C_1$-$C_8$ alkyl group.

Also, $n^1$ and $n^2$ are each independently a molar ratio of the repeating unit represented by Chemical Formula 1 and the repeating unit represented by Chemical Formula 2, $n^1+n^2=1$, in which $n^1$ is a real number of 0.30 to 0.57 and $n^2$ is a real number of 0.43 to 0.70. Particularly, $n^1$ may be a real number of 0.39 to 0.53 and $n^2$ may be a real number of 0.47 to 0.61.

If $n^1$ is less than 0.30 or $n^2$ is greater than 0.70, mechanical strength may decrease. On the other hand, if $n^1$ is greater than 0.57 or $n^2$ is less than 0.43, the ion gel may not be formed, or the polymer electrolyte including the same may become non-uniform.

The copolymer contained in the polymer matrix may be a random copolymer formed by randomly linking the repeating unit represented by Chemical Formula 1 and the repeating unit represented by Chemical Formula 2, or may be a block copolymer composed of blocks having repeating units represented by Chemical Formula 1 and blocks having repeating units represented by Chemical Formula 2, and is preferably a random copolymer. Since the copolymer is a random copolymer, it is simple to manufacture, compared to the process of synthesizing the block copolymer, and both ion conductivity and mechanical properties thereof may be excellent.

As used herein, the term "random copolymer" refers to a copolymer in which different monomers are irregularly distributed randomly along the chain, rather than an alternating copolymer in which different monomers are regularly arranged alternately.

The copolymer may have a weight average molecular weight ($M_w$) of 100,000 to 500,000 g/mol and a number average molecular weight ($M_n$) of 100,000 to 450,000 g/mol, and preferably a weight average molecular weight ($M_w$) of 268,000 to 475,000 g/mol and a number average molecular weight ($M_n$) of 218,000 to 417,000 g/mol. If the weight average molecular weight of the copolymer is less than 100,000 g/mol, mechanical strength may decrease. On the other hand, if the weight average molecular weight thereof exceeds 500,000 g/mol, the viscosity is so high that it is difficult to control the polymer synthesis process.

Specifically, the copolymer according to the present disclosure has superior ion conductivity and mechanical properties, and may thus be applied to high-functional ion gel. In particular, when the random copolymer, in which the ratio of the repeating units constituting the random copolymer and the weight average molecular weight are appropriately adjusted and is applied to the ion gel, the solubility in the ionic liquid may be maintained and superior mechanical properties may result.

(2) Ionic Liquid

According to the present disclosure, the ionic liquid is an ionic compound that is liquid at a temperature of 100° C. or less, and may typically be a salt having a melting point equal to or lower than room temperature (20° C. to 25° C.). The ionic liquid is not particularly limited, so long as it is able to increase the ion conductivity of the ion gel of the present disclosure.

The ionic liquid according to the present disclosure may be selected from the group consisting of 1-ethyl-3-methylimidazolium bis(trifluoromethylsulfonyl)imide ([EMI][TFSI]), 1-ethyl-3-methylimidazolium hexafluorophosphate ([EMI][PF6]), 1-ethyl-3-methylimidazolium tetrafluoroborate ([EMI][BF4]), 1-butyl-3-methylimidazolium bis(trifluoromethylsulfonyl)imide ([BMI][TFSI]), 1-butyl-3-methylimidazolium hexafluorophosphate ([BMI][PF6]), 1-butyl-3-methylimidazolium tetrafluoroborate ([BMI][BF4]) and combinations thereof, and is preferably 1-butyl-3-methylimidazolium bis(trifluoromethylsulfonyl)imide ([BMI][TFSI]).

Polymer Electrolyte

The polymer electrolyte according to the present disclosure is not particularly limited, so long as it has superior ion conductivity and mechanical strength.

Specifically, the polymer electrolyte according to the present disclosure may include the ion gel described above and a metal salt. The metal included in the metal salt may be, for example, lithium (Li), sodium (Na), potassium (K), or calcium (Ca), and is preferably lithium (Li).

The polymer electrolyte according to the present disclosure may include the ion gel of the present disclosure, including 30 to 60 wt % of the polymer matrix and 38 to 68 wt % of the ionic liquid, and 1.5 to 7.0 wt % of the metal salt. If the amount of the polymer matrix is less than 30 wt %, sufficient mechanical strength cannot be attained. On the other hand, if the amount thereof exceeds 60 wt %, ion conductivity may decrease.

The polymer electrolyte according to the present disclosure has an electrical conductivity of 0.50 to 0.80 mS/cm and an elastic modulus of $2.0 \times 10^4$ to $4.0 \times 10^4$ Pa, and thus similar mechanical strength may be maintained and ion conductivity may be improved by 50% or more compared to existing technologies.

Figure 1:
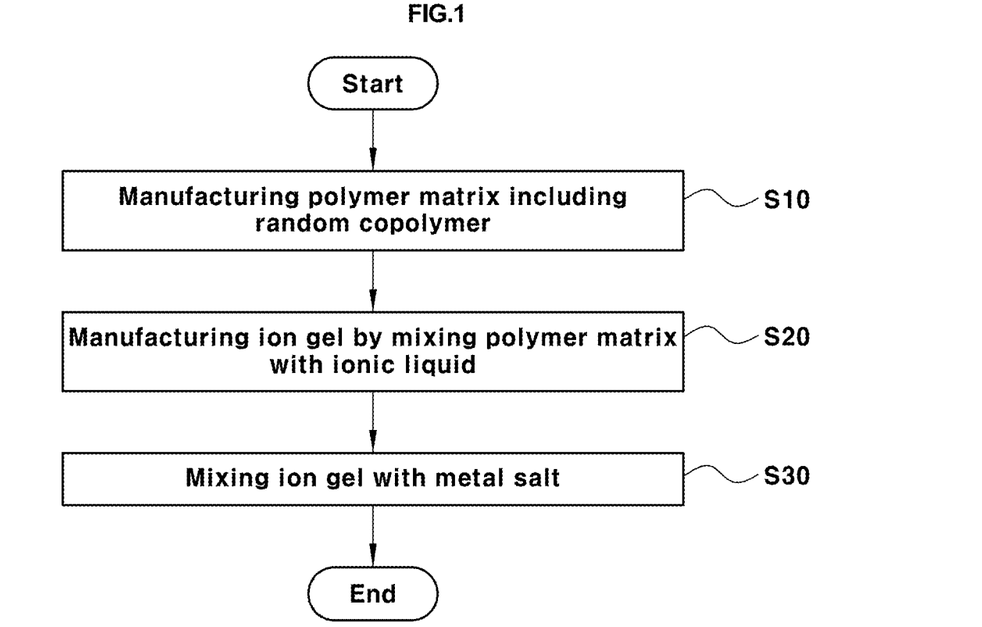
FIG. 1 is a flowchart showing a process of manufacturing an ion gel and a polymer electrolyte according to the present disclosure.

FIG. 1 is a flowchart showing the process of manufacturing the ion gel and the polymer electrolyte according to the present disclosure. With reference thereto, the method includes manufacturing a polymer matrix including a random copolymer (S10), manufacturing an ion gel by mixing the polymer matrix with an ionic liquid (S20), and mixing the ion gel with a metal salt (S30).

In the manufacturing of the polymer matrix (S10), a polymer matrix, including a random copolymer obtained by randomly polymerizing a monomer represented by Chemical Formula 3 below and a monomer represented by Chemical Formula 4 below, is manufactured.

[Chemical Formula 3]

[Chemical Formula 4]

Here, $R^{11}$, $n^{11}$, $R^{12}$, $R^{21}$ and $R^{22}$ may be the same as or different from the above description of the copolymer, $R^{13}$ to $R^{14}$ may be the same as or different from $R^{12}$, and $R^{23}$ and $R^{24}$ may be the same as or different from $R^{21}$.

According to the present disclosure, the monomer represented by Chemical Formula 4 has a glass transition temperature (Tg) of −45 to 55°, and preferably 50° C. Even when the polymer electrolyte is manufactured using a monomer having allow glass transition temperature, the ion conductivity thereof may be higher than that of a conventional polymer electrolyte (including an ionic liquid having high ion conductivity compared to the present disclosure).

According to the present disclosure, the polymerization of the copolymer may be performed through living anionic polymerization, living cationic polymerization, controlled radical polymerization, RAFT (reversible addition-fragmentation chain transfer), ATRP (atom transfer radical polymerization), NMP (nitroxide-mediated polymerization), etc. Preferably, a RAFT process is adopted for effective one-pot polymerization. When using the RAFT process, the above monomers are mixed with ethyl 2-(phenylcarbonothioylthio)-2-phenylacetate and azobisisobutyronitrile (AIBN), purged with Ar gas at room temperature for 30 min to 1.5 hr, and then polymerized at a temperature of 78° C. to 82° C. After the polymerization, the solution may be optionally quenched with liquid nitrogen and precipitated in an excess of methanol to afford a polymer, which is then filtered, dried under reduced pressure at a temperature of 30° C. to 70° C., and purified. This process may be repeated two to five times for additional purification.

The manufacturing the polymer matrix including the random copolymer according to the present disclosure is performed through a one-pot reaction, and there is no additional step of adding a functional group, and thus the ion gel and the polymer electrolyte according to the present disclosure may be manufactured simply and effectively, so that the processing steps are simple and thus high processing efficiency may result and economic benefits may be obtained.

In the manufacturing of the ion gel (S20) and the mixing of the metal salt (S30), the polymer matrix manufactured above is mixed with an ionic liquid to afford an ion gel, which is then mixed with a metal salt. The ionic liquid and the metal salt may be the same as or different from the above description of the ion gel and the polymer electrolyte.

A better understanding of the present disclosure will be given through the following examples, which are merely set forth to illustrate the present disclosure but are not to be construed as limiting the scope of the present disclosure.

Example 1

(S10) Polystyrene-ran-polybutyl acrylate (Ps-r-PBA) was synthesized through one-pot RAFT (reversible addition-fragmentation chain transfer) polymerization (Scheme 1 below).

[Scheme 1]

-continued

Specifically, monomers (i.e. styrene and butyl acrylate) were passed through a column packed with basic alumina for purification. Next, styrene (12.18 g, 116.93 mmol), butyl acrylate (22.48 g, 175.39 mmol), ethyl 2-(phenylcarbonothioylthio)-2-phenylacetate (1.93 mg, 0.0061 mmol) and AIBN (0.2 mg, 0.0012 mmol) were placed in a flask equipped with a magnetic stirrer rod. The reaction mixture was purged with argon (Ar) gas at room temperature for 1 hr and then reacted at 80° C. After 18 hr, the solution was quenched with liquid nitrogen. The reaction product was precipitated in an excess of methanol to afford Ps-r-PBA, which was then filtered and dried at 60° C. under reduced pressure. This process was repeated three times for additional purification. The number average molecular weight ($M_n$) and the weight average molecular weight ($M_w$) of Ps-r-PBA, measured through size exclusion chromatography (SEC) based on PS-standard calibration, were 417,000 and 475,000, respectively, and the amount of polystyrene contained in the Ps-r-PBA was 53.3 mol %.

(S20) The Ps-r-PBA was mixed with 105 mg of 1-butyl-3-methylimidazolium bis(trifluoromethylsulfonyl)imide ([BMI][TFSI]) as an ion gel liquid.

Consequently, an ion gel including 40 wt % of the polymer matrix and 60 wt % of the ionic liquid was manufactured.

Example 2-1

Anion gel was manufactured in the same manner as in Example 1, with the exception that the number average molecular weight ($M_n$) and the weight average molecular weight ($M_w$) of Ps-r-PBA, obtained by adding styrene (6.09 g, 58.46 mmol) and butyl acrylate (11.24 g, 87.70 mmol), were 247,000 and 274,000, respectively.

Example 2-2

Anion gel was manufactured in the same manner as in Example 1, with the exception that the number average molecular weight ($M_n$) and the weight average molecular weight ($M_w$) of Ps-r-PBA, obtained by adding styrene (3.04 g, 29.23 mmol) and butyl acrylate (5.62 g, 43.85 mmol), were 109,000 and 128,000, respectively.

Example 3-1

A polymer electrolyte comprising 39.2 wt % of the polymer matrix, 59 wt % of the ionic liquid and 1.8 wt % of a lithium salt was manufactured by mixing the ion gel manufactured in Example 1 with 3.21 mg of lithium (Li).

Example 3-2

A polymer electrolyte comprising 38.6 wt % of the polymer matrix, 57.9 wt % of the ionic liquid and 3.5 wt % of a lithium salt was manufactured by mixing the ion gel manufactured in Example 1 with 6.35 mg of lithium (Li).

Example 3-3

A polymer electrolyte comprising 38.0 wt % of the polymer matrix, 56.9 wt % of the ionic liquid and 5.1 wt % of a lithium salt was manufactured by mixing the ion gel manufactured in Example 1 with 9.39 mg of lithium (Li).

Example 3-4

A polymer electrolyte comprising 37.3 wt % of the polymer matrix, 56 wt % of the ionic liquid and 6.7 wt % of a lithium salt was manufactured by mixing the ion gel manufactured in Example 1 with 12.57 mg of lithium (Li).

Comparative Example 1

Anion gel was manufactured in the same manner as in Example 1, with the exception that the number average molecular weight ($M_n$) and the weight average molecular weight ($M_w$) of Ps-r-PBA, obtained by adding styrene (7.61 g, 73.08 mmol) and butyl acrylate (9.37 g, 73.08 mmol), were 250,000 and 305,000, respectively, and the amount of polystyrene contained in Ps-r-PBA was 57.2 mol %.

Comparative Example 2

Anion gel was manufactured in the same manner as in Example 1, with the exception that the number average molecular weight ($M_n$) and the weight average molecular weight ($M_w$) of Ps-r-PBA, obtained by adding styrene (9.13 g, 87.70 mmol) and butyl acrylate (7.49 g, 58.46 mmol), were 218,000 and 268,000, respectively, and the amount of polystyrene contained in Ps-r-PBA was 59.1 mol %.

Comparative Example 3

Anion gel was manufactured in the same manner as in Example 1, with the exception that the number average molecular weight ($M_n$) and the weight average molecular weight ($M_w$) of Ps-r-PBA, obtained by adding styrene (1.52 g, 14.62 mmol) and butyl acrylate (7.49 g, 58.46 mmol), were 144,000 and 172,000, respectively, and the amount of polystyrene contained in Ps-r-PBA was 39.0 mol %.

Comparative Example 4

Anion gel was manufactured in the same manner as in Example 1, with the exception that the number average molecular weight ($M_n$) and the weight average molecular weight ($M_w$) of Ps-r-PBA, obtained by adding styrene (2.28 g, 21.92 mmol) and butyl acrylate (6.56 g, 51.16 mmol), were 107,000 and 123,000, respectively, and the amount of polystyrene contained in Ps-r-PBA was 39.0 mol %.

Comparative Example 5

Anion gel was manufactured in the same manner as in Example 1, with the exception that the number average molecular weight ($M_n$) of Ps-r-PMMA, obtained by adding methyl methacrylate (11.71 g, 116.93 mmol) in lieu of butyl acrylate, was 220,000 g/mol, the amount of polystyrene contained in Ps-r-PMMA was 29.0 mol %, and 1-ethyl-3-methylimidazolium bis(trifluoromethylsulfonyl)imide ([EMI][TFSI]) was added as the ionic liquid, in lieu of [BMI][TFSI].

Test Example 1—Properties of Prepared Random Copolymer

Figure 2:
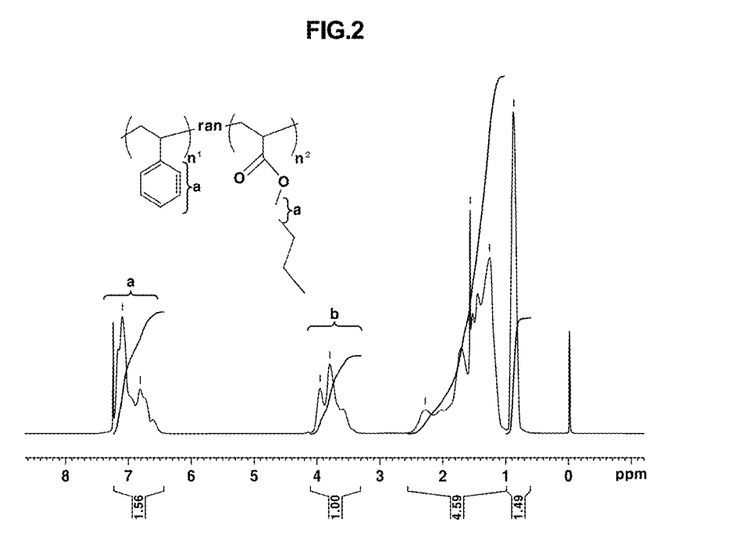
FIG. 2 is a graph showing a $^1H$ NMR spectrum of Ps-r-PBA.

As shown in the $^1$H NMR spectrum of FIG. 2, the random copolymer was confirmed to be successfully synthesized. Specifically, as shown in FIG. 2, hydrogen of styrene was confirmed based on the peak and peak area of region a, and moreover, hydrogen of the methyl group ($CH_2$) stripped by the adjacent carbonyl group and oxygen was confirmed based on the peak and peak area of region b, indicating that Ps-r-PBA according to the present disclosure was successfully synthesized.

Test Example 2—Implementation Conditions of Uniform Ion Gel System Depending on Random Copolymer Composition in Polymer Matrix A test was performed in order to evaluate whether the ion gel manufactured in Example 2-1 and Comparative Examples 1 and 2 were uniformly formed to realize an ion gel system.

Figure 3A:
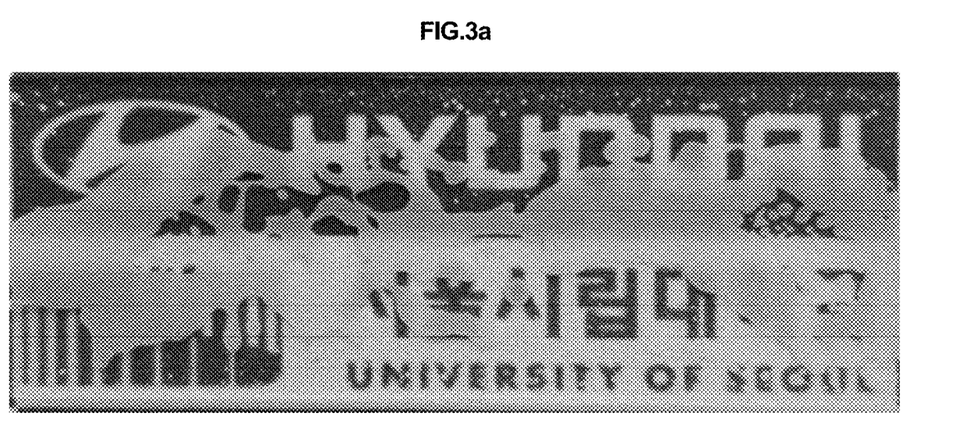
FIG. 3A is an image confirming whether the uniform gel system of an ion gel manufactured using the composition of Comparative Example 2 is realized.
Figure 3B:
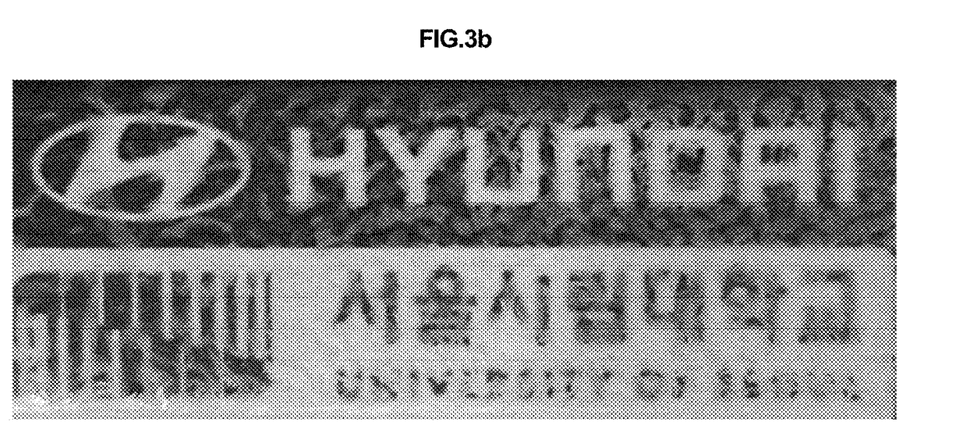
FIG. 3B is an image confirming whether the uniform gel system of an ion gel manufactured using the composition of Comparative Example 1 is realized.

As shown in FIGS. 3A and 3B, it was confirmed that the ion gel manufactured in Comparative Examples 1 and 2 was not in the form of a uniform system.

Figure 3C:
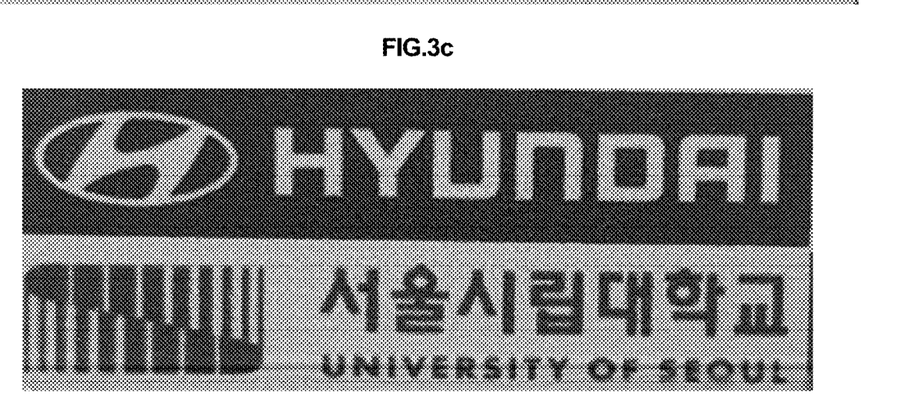
FIG. 3C is an image confirming whether the uniform gel system of an ion gel manufactured using the composition of Example 2-1 is realized.

As shown in FIG. 3C, it was confirmed that the ion gel manufactured in Example 2-1 was in the form of a uniform system.

Therefore, it can be concluded that, when the amount of styrene in the random copolymer is 53.7 mol % or less, the resulting ion gel can be provided in the form of a uniform system.

Test Example 3—Changes in Properties of Ion Gel System Depending on Random Copolymer Composition in Polymer Matrix The properties of the ion gels manufactured in Example 2-2 and Comparative Examples 3 and 4, electrical conductivity and elastic modulus, were measured.

The ion conductivity of the ion gel was measured using an electrochemical impedance spectrophotometer (IM6, ZAHNER), in which the frequency and the AC amplitude were 10-1 Hz to 106 Hz and 10 mV, respectively.

The resistance (R) of ion conductivity was measured to be 2721.3Ω and 3235.2 to 3359.3Ω in the ion gel including 40 wt % of Ps-r-PBA. The ion conductivity was calculated to be 0.52 mS/cm and 0.48 to 0.46 mS/cm using a cylindrical cell (diameter: 4 mm and thickness (h): 2 mm, 6=h/AR (where A is a cross-sectional area)).

The mechanical properties of the ion gel were measured using a dynamic mechanical analyzer (DMA, Q800, TA instruments, USA). For the compression test, a hexahedral sample (thickness: 1.73 mm and width: 8.00 mm) was used. A stress-strain curve was recorded based on changes in strain from 0% to 20% at a scan rate of 3 N/min, and the elastic modulus was calculated from the slope of the line with respect to the data in the linear region.

Figure 4A:
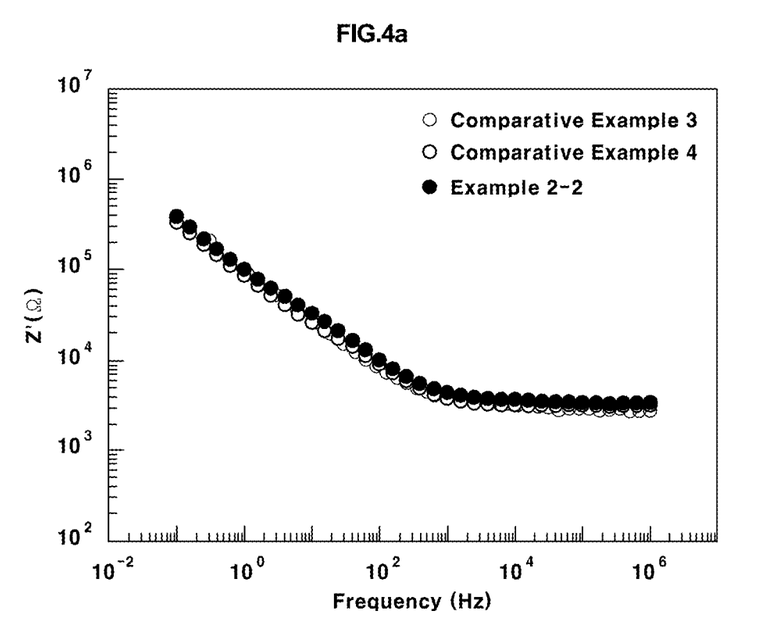
FIG. 4A is a graph showing the measurement results of ion conductivity of the ion gels manufactured using the compositions of Example 2-2 and Comparative Examples 3 and 4.
Figure 4B:
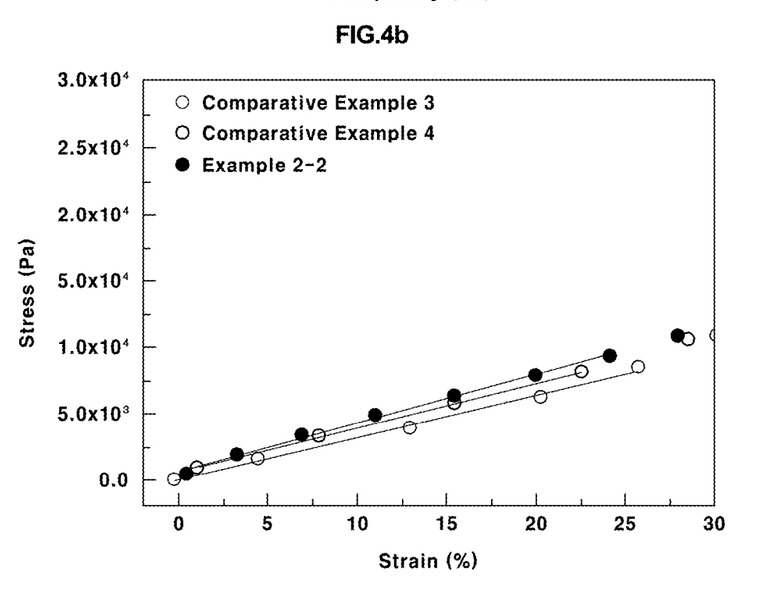
FIG. 4B is a graph showing the measurement results of elastic modulus of the ion gels manufactured using the compositions of Example 2-2 and Comparative Examples 3 and 4.

As shown in FIGS. 4A and 4B, when the amount of the styrene monomer in the polymer matrix of the ion gel was increased from 39.0 mol % to 53.7 mol %, the ion conductivity was about 0.58 mS/cm in Comparative Example 3, about 0.55 mS/cm in Comparative Example 4 and about 0.54 mS/cm in Example 2-2, all of which were similar, but the elastic modulus was about $1.4 \times 10^4$ Pa in Comparative Example 3, about $1.7 \times 10^4$ Pa in Comparative Example 4 and about $2.1 \times 10^4$ Pa in Example 2-2, representing gradual increases.

Therefore, it can be concluded that the ion conductivity and mechanical strength of the ion gel according to the present disclosure were superior when the amount of the styrene monomer therein was about 52 to 55 mol %.

Test Example 4—Changes in Properties of Ion Gel System Depending on Molecular Weight of Random Copolymer in Polymer Matrix The properties of the ion gels manufactured in Examples 1, 2-1 and 2-2, ion conductivity and elastic modulus, were measured.

The ion conductivity and elastic modulus of the ion gel were measured in the same manner as in Test Example 3.

Figure 5A:
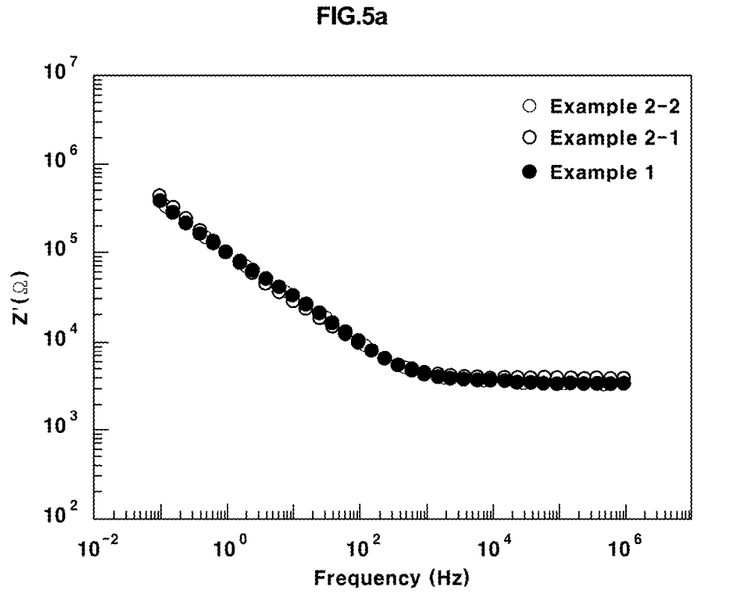
FIG. 5A is a graph showing the measurement results of ion conductivity of the ion gels manufactured in Examples 1, 2-1 and 2-2 using the same styrene composition but with different molecular weights.
Figure 5B:
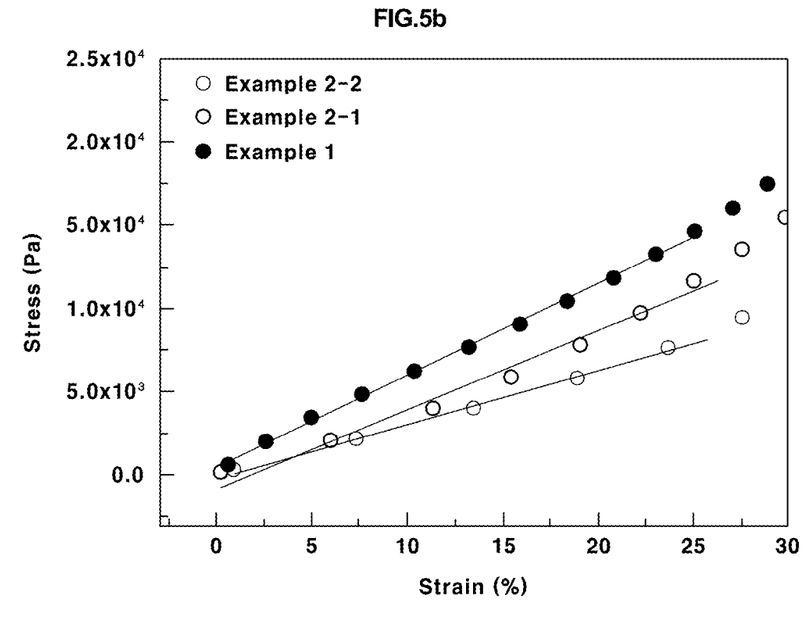
FIG. 5B is a graph showing the measurement results of elastic modulus of the ion gels manufactured in Examples 1, 2-1 and 2-2 using the same styrene composition but with different molecular weights.

As shown in FIGS. 5A and 5B, when the weight average molecular weight ($M_w$) of the polymer matrix was increased from low molecular weight (100,000 g/mol to 200,000 g/mol) to medium molecular weight (200,000 g/mol to 400,000 g/mol) and high molecular weight (400,000 g/mol or more) under the condition that the amount of the styrene monomer of the polymer matrix of the ion gel was maintained in the range of 52 to 55 mol %, the ion conductivity was about 0.54 mS/cm in Example 2-2, about 0.52 mS/cm in Example 2-1 and about 0.53 mS/cm in Example 1, all of which were similar, but the elastic modulus was about $2.1 \times 10^4$ Pa in Example 2-2, about $3.7 \times 10^4$ Pa in Example 2-1 and about $5.5 \times 10^4$ Pa in Example 1, showing that Example 1 was increased at least 2.5 times compared to Example 2-2.

Therefore, it can be concluded that, when the weight average molecular weight ($M_w$) of the polymer matrix including 52 to 55 mol % of the styrene monomer fell in the high molecular weight range (470,000 to 490,000 g/mol), the ion conductivity and mechanical strength of the ion gel including the polymer matrix were superior.

Test Example 5—Comparison of Ion Conductivity with Conventional Ion Gel System Having High Glass Transition Temperature (Tg)

In order to evaluate the ion conductivity of the ion gel depending on the Tg of the monomer, the ion conductivity values of the ion gels manufactured in Example 2-1 and Comparative Example 5 were compared.

The ion conductivity was measured in the same manner as in Test Example 3.

Figure 6:
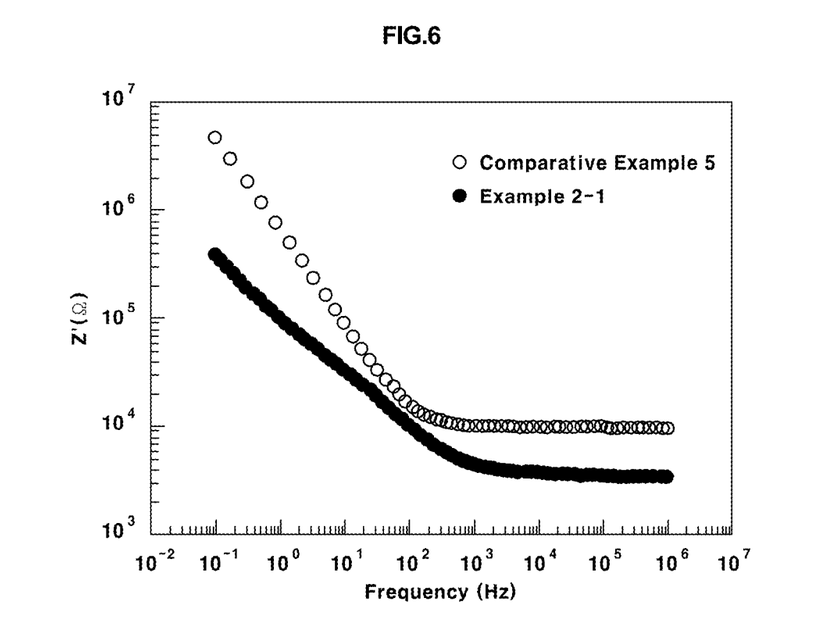
FIG. 6 is a graph showing the measurement results of ion conductivity of the ion gel manufactured in Example 2-1 using a monomer having a low glass transition temperature and the ion gel manufactured in Comparative Example 5 using a monomer having a high glass transition temperature.

As shown in FIG. 6, the ion gel of Comparative Example 5 was manufactured using [EMI][TFSI], which is the ionic liquid having higher Tg as a high glass transition temperature (Tg) system (Tg=120° C.) but exhibited ion conductivity of about ⅓ of that of Example 2-1 including the ionic liquid having lower Tg as a relatively low glass transition temperature (Tg) system (Tg=−50° C.) (ion conductivity of Comparative Example 5: 0.17 mS/cm, and ion conductivity of Example 2-2: 0.52 mS/cm).

Therefore, it can be concluded that the ion gel system of the present disclosure is a system (Tg=−50° C.) manufactured using a monomer having a low glass transition temperature (Tg) but high ion conductivity, resulting in superior electrochemical properties.

Test Example 6—Control of Properties of Polymer Electrolyte Including Ion Gel System of the Present Disclosure In order to control the properties of the polymer electrolyte by mixing the optimal ion gel system confirmed through the Test Examples above with a metal salt, the polymer electrolytes were manufactured as in Examples 3-1 to 3-4 and the properties thereof, i.e., ion conductivity and elastic modulus, were measured.

Figure 7A:
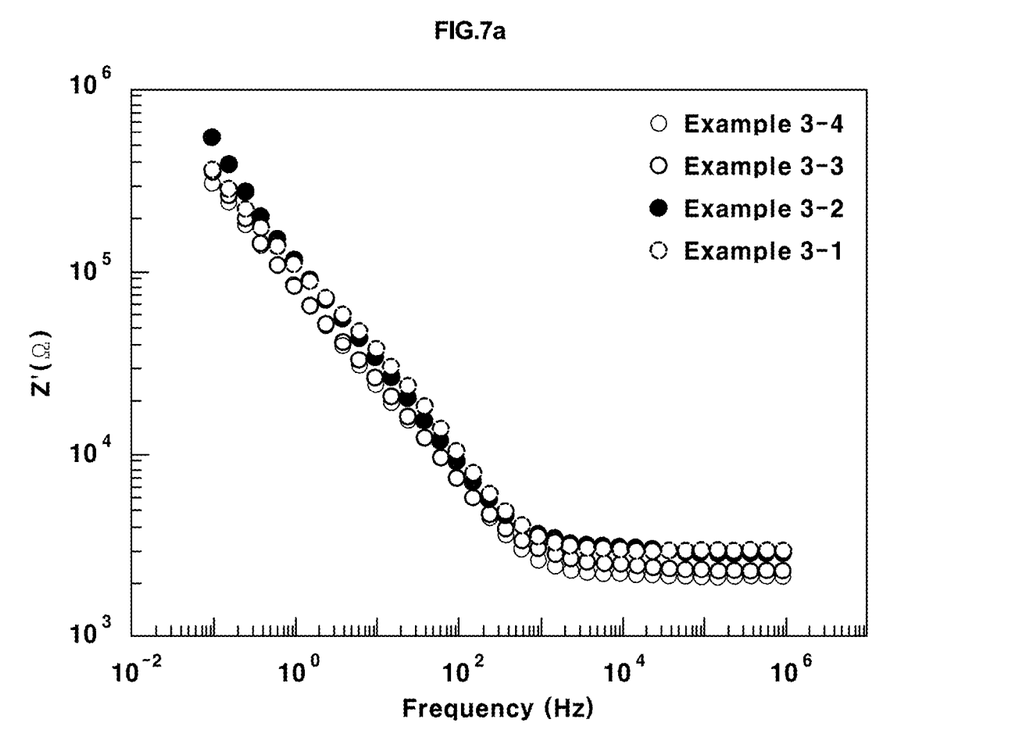
FIG. 7A is a graph showing the measurement results of ion conductivity of the polymer electrolytes manufactured using the metal salts of Examples 3-1 to 3-4.
Figure 7B:
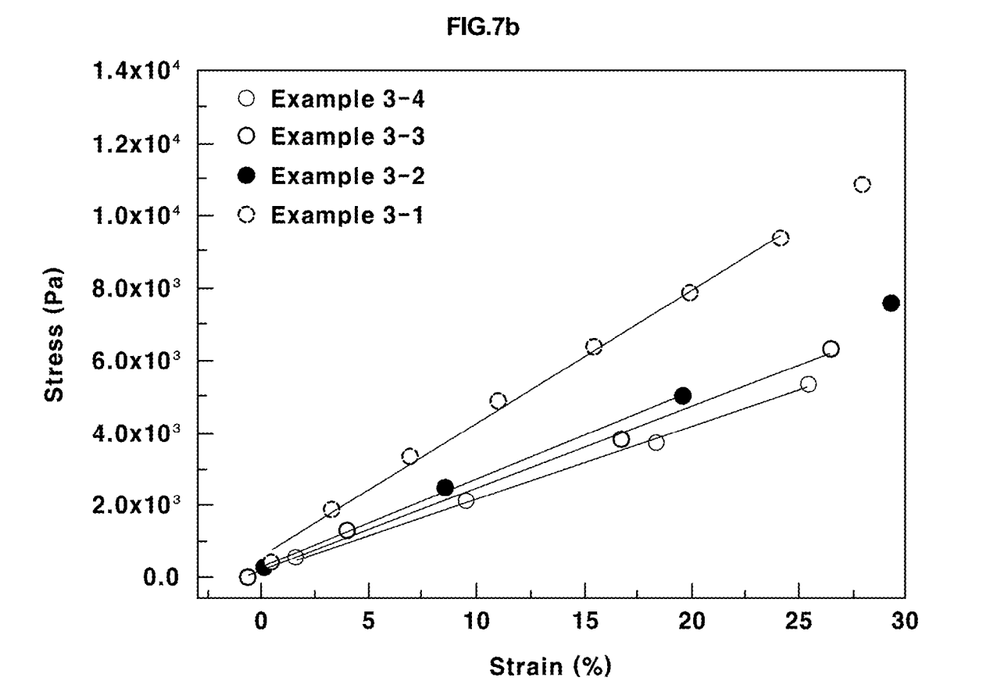
FIG. 7B is a graph showing the measurement results of elastic modulus of the polymer electrolytes manufactured using the metal salts of Examples 3-1 to 3-4.

As shown in FIGS. 7A and 7B, when the amount (wt %) of the metal salt was increased, the elastic modulus, which is mechanical strength, was about $3.8 \times 10^4$ Pa in Example 3-1, about $2.6 \times 10^4$ Pa in Example 3-2, about $2.1 \times 10^4$ Pa in Example 3-3 and about $1.9 \times 10^4$ Pa in Example 3-4, which were slightly decreased, but the ion conductivity, which is an electrochemical property, was about 0.54 mS/cm in Example 3-1, about 0.55 mS/cm in Example 3-2, about 0.69 mS/cm in Example 3-3 and about 0.75 mS/cm in Example 3-4, which were remarkably increased.

Therefore, it can be concluded that the polymer electrolyte system according to the present disclosure is capable of controlling mechanical properties, i.e. elastic modulus, and electrochemical properties, i.e., ion conductivity, by adjusting the amount of the metal salt while including the optimal ion gel system.

Although variations of the present disclosure have been disclosed for illustrative purposes, those skilled in the art will appreciate that various modifications are possible without departing from the scope and spirit of the disclosure as disclosed in the accompanying claims, and such modifications should not be understood separately from the technical ideas or desired characteristics of the present disclosure.

What is claimed is:

1. An ion gel, comprising:
   a polymer matrix including a random copolymer having a repeating unit represented by Chemical Formula 1 below and a repeating unit represented by Chemical Formula 2 below; and
   an ionic liquid,
   wherein a weight average molecular weight ($M_w$) of the random copolymer is 268,000 to 475,000 g/mol or a number average molecular weight ($M_n$) of the random copolymer is 218,000 to 417,000 g/mol.

[Chemical Formula 1]

[Chemical Formula 2]

wherein each $R^{11}$ is independently selected from the group consisting of a halogen group, a nitrile group, a nitro group, an amine group, a substituted or unsubstituted $C_1$-$C_{10}$ alkyl group, a substituted or unsubstituted $C_1$-$C_{10}$ alkoxy group, a substituted or unsubstituted aryl group, a substituted or unsubstituted $C_5$-$C_{14}$ heteroaryl group and combinations thereof,
$n^{11}$ is 0 to 5, $R^{12}$ is selected from the group consisting of hydrogen, a halogen group, a nitrile group, a nitro group, an amine group, a substituted or unsubstituted $C_1$-$C_{10}$ alkyl group, a substituted or unsubstituted $C_1$-$C_{10}$ alkoxy group, a substituted or unsubstituted $C_5$-$C_{14}$ aryl group, a substituted or unsubstituted heteroaryl group and combinations thereof, $R^{21}$ is selected from the group consisting of hydrogen, a halogen group, a nitrile group, a nitro group, an amine group, a substituted or unsubstituted $C_1$-$C_{10}$ alkyl group, a substituted or unsubstituted $C_1$-$C_{10}$ alkoxy group, a substituted or unsubstituted aryl group, a substituted or unsubstituted heteroaryl group and combinations thereof, $R^{22}$ is selected from the group consisting of a substituted or unsubstituted $C_1$-$C_{12}$ alkyl group, a substituted or unsubstituted aryl group, a substituted or unsubstituted heteroaryl group and combinations thereof, substituents of $R^{11}$ to $R^{22}$ are each independently selected from the group consisting of a halogen group, a cyano group, a nitro group, $C_1$-$C_8$ alkyl group and combinations thereof, and $n^1$ and $n^2$ are each independently a molar ratio of the repeating units, $n^1 + n^2 = 1$, wherein $n^1$ is a real number of 0.30 to 0.57, and $n^2$ is a real number of 0.43 to 0.70.

2. The ion gel of claim 1, comprising:
   30 to 60 wt % of the polymer matrix; and
   40 to 70 wt % of the ionic liquid.

3. The ion gel of claim 1, wherein the ionic liquid is selected from the group consisting of 1-ethyl-3-methylimidazolium bis(trifluoromethylsulfonyl)imide ([EMI][TFSI]), 1-ethyl-3-methylimidazolium hexafluorophosphate ([EMI][PF6]), 1-ethyl-3-methylimidazolium tetrafluoroborate ([EMI] [BF4]), 1-butyl-3-methylimidazolium bis(trifluoromethylsulfonyl)imide ([BMI][TFSI]), 1-butyl-3-methylimidazolium hexafluorophosphate ([BMI][PF6]), 1-butyl-3-methylimidazolium tetrafluoroborate ([BMI][BF4]) and combinations thereof.

4. The ion gel of claim 1, which has an electrical conductivity of 0.50 to 0.60 mS/cm and an elastic modulus of $1.3 \times 10^4$ to $5.6 \times 10^4$ Pa.

5. A polymer electrolyte comprising the ion gel of claim 1 and a metal salt.

6. The polymer electrolyte of claim 5, comprising:
   30 to 60 wt % of the polymer matrix;
   38 to 68 wt % of the ionic liquid; and
   1.5 to 7.0 wt % of the metal salt.

7. The polymer electrolyte of claim 5, wherein a metal of the metal salt is selected from the group consisting of lithium (Li), sodium (Na), potassium (K), calcium (Ca) and combinations thereof.

8. The polymer electrolyte of claim 5, having an electrical conductivity of 0.50 to 0.80 mS/cm and an elastic modulus of $2.0 \times 10^4$ to $4.0 \times 10^4$ Pa.

9. A method of manufacturing an ion gel, the method comprising:
   manufacturing a polymer matrix including a random copolymer obtained by randomly polymerizing a monomer represented by Chemical Formula 3 below and a monomer represented by Chemical Formula 4 below; and
   manufacturing an ion gel by mixing the polymer matrix with an ionic liquid,
   wherein a weight average molecular weight ($M_w$) of the random copolymer is 268,000 to 475,000 g/mol or a number average molecular weight ($M_n$) of the random copolymer is 218,000 to 417,000 g/mol.

[Chemical Formula 3]

[Chemical Formula 4]

wherein each $R^{11}$ is independently selected from the group consisting of a halogen group, a nitrile group, a nitro group, an amine group, a substituted or unsubstituted $C_1$-$C_{10}$ alkyl group, a substituted or unsubstituted $C_1$-$C_{10}$ alkoxy group, a substituted or unsubstituted aryl group, a substituted or unsubstituted heteroaryl group and combinations thereof, $n^{11}$ is 0 to 5, $R^{12}$ to $R^{14}$ are selected from the group consisting of hydrogen, a halogen group, a nitrile group, a nitro group, an amine group, a substituted or unsubstituted $C_1$-$C_{10}$ alkyl group, a substituted or unsubstituted $C_1$-$C_{10}$ alkoxy group, a substituted or unsubstituted aryl group, a substituted or unsubstituted heteroaryl group and combinations thereof, $R^{21}$, $R^{23}$ and $R^{24}$ are selected from the group consisting of hydrogen, a halogen group, a nitrile group, a nitro group, an amine group, a substituted or unsubstituted $C_1$-$C_{10}$ alkyl group, a substituted or unsubstituted $C_1$-$C_{10}$ alkoxy group, a substituted or unsubstituted aryl group, a substituted or unsubstituted heteroaryl group and combinations thereof, $R^{22}$ is selected from the group consisting of a substituted or unsubstituted $C_1$-$C_{12}$ alkyl group, a substituted or unsubstituted aryl group, a substituted or unsubstituted heteroaryl group and combinations thereof, and substituents of $R^{11}$ to $R^{24}$ are each independently a halogen group, a cyano group, a nitro group, or a $C_1$-$C_8$ alkyl group.

10. The method of claim 9, wherein the manufacturing of the polymer matrix is performed through a one-pot reaction.

11. The method of claim 9, wherein the monomer represented by Chemical Formula 4 has a glass transition temperature (Tg) of −45 to −55° C.

12. The method of claim 9, wherein the ionic liquid is selected from the group consisting of 1-ethyl-3-methylimidazolium bis(trifluoromethylsulfonyl)imide ([EMI][TFSI]), 1-ethyl-3-methylimidazolium hexafluorophosphate ([EMI][PF6]), 1-ethyl-3-methylimidazolium tetrafluoroborate ([EMI][BF4]), 1-butyl-3-methylimidazolium bis(trifluoromethylsulfonyl)imide ([BMI][TFSI]), 1-butyl-3-methylimidazolium hexafluorophosphate ([BMI][PF6]), 1-butyl-3-methylimidazolium tetrafluoroborate ([BMI][BF4]) and combinations thereof.

13. A method of manufacturing a polymer electrolyte, the method comprising mixing an ion gel manufactured by the method of claim 9 with a metal salt.

14. The method of claim 13, wherein a metal of the metal salt is selected from the group consisting of lithium (Li), sodium (Na), potassium (K), calcium (Ca) and combinations thereof.

* * * * *

UNITED STATES PATENT AND TRADEMARK OFFICE
CERTIFICATE OF CORRECTION

PATENT NO. : 11,643,496 B2
APPLICATION NO. : 17/000678
DATED : May 9, 2023
INVENTOR(S) : Ho Taek Lee et al.

It is certified that error appears in the above-identified patent and that said Letters Patent is hereby corrected as shown below:

On the Title Page

Item (72) Inventors:
"Ho Taek Lee, Seoul (KR)
Young Min Kim, Seoul (KR)
Hong Chui Moon, Seoul (KR)"

Should read:
-- Ho Taek Lee, Seoul (KR)
Young Min Kim, Seoul (KR)
Hong Chul Moon, Seoul (KR) --

Signed and Sealed this
Nineteenth Day of September, 2023

Katherine Kelly Vidal
*Director of the United States Patent and Trademark Office*